June 13, 1939.  J. J. JAKOSKY  2,162,087

METHOD AND APPARATUS FOR ELECTRICAL EXPLORATION OF THE SUBSURFACE

Filed July 13, 1938　　2 Sheets-Sheet 1

INVENTOR.
John Jay Jakosky,
BY Arthur P. Knight &
Alfred W. Knight
ATTORNEYS.

June 13, 1939.   J. J. JAKOSKY   2,162,087
METHOD AND APPARATUS FOR ELECTRICAL EXPLORATION OF THE SUBSURFACE
Filed July 13, 1938   2 Sheets-Sheet 2

INVENTOR.
John Jay Jakosky,
BY
ATTORNEYS.

Patented June 13, 1939

2,162,087

UNITED STATES PATENT OFFICE 2,162,087

METHOD AND APPARATUS FOR ELECTRICAL EXPLORATION OF THE SUBSURFACE

John Jay Jakosky, Los Angeles, Calif.

Application July 13, 1938, Serial No. 219,003

17 Claims. (Cl. 175—182)

This invention relates to a method and apparatus for the electrical exploration of the subsurface and pertains more particularly to a method and apparatus which may be used to eliminate the effects of natural earth potentials from measurements involving the potential created between spaced points on the earth's surface by the passage of an electric current through the earth in the region of such spaced points.

It is well known that natural earth currents flow over rather large areas and produce potentials between spaced points on the earth's surface which fluctuate rapidly and sometimes vary between values which are on the order of magnitude of the artificially created potentials which it is desired to measure between such spaced points. In many instances, the fluctuations in natural earth potential are greater than the variation in the created potential due to variations in the characteristics or structure of the subsurface. Thus, unless careful consideration is given to these natural earth potentials, measurements involving artificially created potentials may be greatly in error.

In order to overcome the effects of these natural earth or ground potentials, methods have been used in which the earth has been energized with alternating current. However, this introduces additional complications in requiring more complex measuring and energizing devices. Also, additional complications are introduced by phase angle errors and the like. In order to overcome some of the difficulties encountered with alternating current, reversing commutator devices have been used and they also require the use of relatively complicated apparatus and procedures and at the same time possess the disadvantages of alternating current methods. Although alternating current methods offer certain advantages for minimizing the effects of ground currents, their use precludes taking advantage of the electrolytic effects associated with the flow or diffusion of a direct or unidirectional current through the electrolytically impregnated earth materials. The latter effects give rise to measured values which are characterized by sharp definite trend changes, and allow clear correlation of the depth-resistivity curves obtained at each station where a series of measurements may be made. In order to employ the unidirectional current energizing method, it is essential that some means be provided for compensating for the effects of the irregularly varying unidirectional earth currents.

A common manner of eliminating ground potentials from potential measurements has been to take a measurement of ground potential between two spaced points prior to energizing the earth to produce a created potential between said points, and then measuring the combined ground and created potentials or the created potential alone. In the first case the previously measured ground potential is then subtracted from the combined measurements to give the created potential, and in the second case the previously measured ground potential is subtracted electrically through introducing an opposing potential in the measuring circuit. Although measurements may be made in rapid succession, on the order of seconds apart, the natural earth potentials fluctuate rapidly at times so that the value of the ground potential may change considerably in the few seconds between the measurement thereof and the measurement involving the created potential. Thus, in order to obtain corrected values of created potential by taking successive measurements of the earth potential and the created potential, it is necessary for these measurements to be taken in rapid succession, usually more rapidly than they can be taken accurately by an experienced operator.

The principal object of the invention is to provide a method and apparatus for the electrical exploration of the subsurface with which measurements involving the potential created between a pair of spaced points on the earth's surface may be continuously corrected for the errors due to natural earth potentials.

Another important object of the invention is to provide for the continuous measurement over long periods of time, and during the flow of energizing current, of a quantity involving the potential created between a pair of spaced points on the earth's surface, while continuously correcting such measurements for errors resulting from natural earth potential.

Another object of the invention is to provide for the measurement of the relation of an energizing current to the potential created between a pair of spaced points thereby while maintaining such measurements free from errors due to natural earth potential.

Another object of the invention is to provide for the direct measurement of the potential difference created between a pair of spaced points on the earth's surface by an energizing current while continuously maintaining such measurement free from errors due to natural earth potentials.

Another object of the invention is to provide an apparatus and a method whereby the effects of earth currents may be automatically and continuously compensated for. This method of automatic compensation may be utilized in any type of measurement involving the differentiation of two variable quantities, one of which may be arbitrarily created and the other may be irregularly varying.

Further objects and advantages of the invention, of which the above are typical, will be apparent as the description proceeds.

According to this invention an electric energizing current is passed through the earth between a pair of spaced energizing electrodes to create a potential difference between a pair of spaced points on the earth's surface. A measurement is made involving the created potential existing between the pair of spaced points during the flow of current while minimizing or substantially nullifying the effects of natural earth potentials on such measurements in accordance with a potential difference existing between a pair of spaced points on the earth's surface and resulting substantially wholly from natural earth potentials, as by introducing a potential in opposition to the natural earth potential between the first-mentioned pair of points, which introduced potential is varied in accordance with the natural earth potential between the last-mentioned pair of points.

The last-named pair of points are so located on the earth's surface that the potential difference therebetween is substantially unaffected by the flow of energizing current, and they may be located at a position in the region undergoing survey which is sufficiently removed from the energizing electrodes so that they are substantially outside the path of flow of the energizing current, or they may be located so that they are substantially equally affected by the energizing current, either at points adjacent or removed from the energizing electrodes. The pair of points which are utilized in the measurements involving the created potential and the pair of points which are used to supply the ground potential correction and whose potential difference is substantially unaffected by the energizing current, are preferably so related to one another that the natural earth potentials between the points of each pair are either equal to one another or bear a known relation to one another.

For this purpose, the straight line between the two points of one pair should extend in the same direction as the straight line between the two points of the other pair, and the spacing between the points of one pair should be either equal to, or have a known relation to, the spacing between the points of the other pair. For example, the two pairs of points may be located on parallel lines on the earth's surface or on the same straight line, as for example, on the line passing through the energizing electrodes. For the sake of simplicity, one point may be common to each pair of points. Thus in the ensuing description and in the appended claims, it will be understood that statements concerning two pairs of points are meant to include three points in which one point is common to each pair, as well as two separate pairs of points. It is generally preferable, however, to utilize two space-separated pairs of points when obtaining a measurement involving the potential created between the points of one pair in order to avoid the effects of the potential drop adjacent a point common to both pairs. If even a small current flows in a potential circuit connected to one of the pairs of points, it will introduce a small potential adjacent the electrode at the common point, and this potential drop will be transmitted to a potential circuit connected to the other pair of points, making it difficult to obtain accurate results.

The flow of energizing current may then be repeated or continued while varying one or more factors such as the path of current, the magnitude of current, or the time duration of current flow, or the position of one or more of the spaced potential points, in such manner as to produce variations in the created potential indicative of variations or inhomogeneities in the subsurface at different depths or at different positions, and measurements involving the created potentials corrected in accordance with the natural earth potentials existing between a pair of spaced points may be made continuously or at intervals as the potential is so varied. For example, the path of current flow may be varied by successively changing the position of at least one of the energizing electrodes and passing current between said electrodes at each of the successive positions while taking a measurement as above described for each such position.

References herein to the taking of measurement involving potential, or potential difference, are intended to include the direct measurement of the potential difference existing between a pair of spaced points, the direct measurement of the relation between the energizing current and the potential difference existing between a pair of spaced points, or a measurement of the energizing current required to maintain a predetermined potential difference between a pair of spaced points on the earth's surface. In order to obtain the advantages of the electrochemical phenomena associated with the flow of an electric current through the subsurface comprised of a multiplicity of layers of differing electrolytes, I preferably use undirectional current, either pulsating or continuous, for energizing the earth. The current may be either of constant or variable magnitude and is preferably controlled in a predetermined manner, as, for example, by varying the magnitude of the current in accordance with some function of the spacing between the energizing electrodes.

Apparatus according to this invention, in its preferred form, may comprise a pair of energizing electrodes in electrical contact with the earth at positions spaced from one another, and a source of unidirectional current associated with said electrodes for passing an electric current through the earth therebetween. The apparatus further comprises means responsive to the potential difference existing between a pair of spaced points which are so located on the earth's surface that the potential difference therebetween is substantially unaffected by the flow of energizing current, and an electric circuit including another potential responsive means connected to a pair of spaced points on the earth's surface positioned to be affected by both the created and natural earth potentials. The electric circuit includes a voltage connected in opposition to the natural earth potentials existing between the last-named pair of points and means are provided for adjusting said opposing voltage to neutralize the natural earth potentials, in accordance with the response of the first-named potential-responsive means. The apparatus preferably further comprises means for controlling or measuring the magnitude of the current passed through the earth between the energizing electrodes.

More, specifically, I prefer to provide an electric circuit connected to the earth at two spaced points between which a potential is created by the passage of an electric current through the earth between the energizing electrodes, and including a source of opposing voltage and a potential-responsive means, whereby said electric circuit is subject to the combined effects of the created and natural earth potentials and said potential-responsive means may be made responsive to said created potential alone by adjusting said opposing voltage to neutralize the effect of natural earth potential thereon, and another potential-responsive means connected to the earth at two spaced points between which there is substantially no potential difference created by the passage of such energizing current, whereby this other potential-responsive means is subject, substantially solely, to the natural earth potential in the region undergoing survey. The opposing voltage above referred to is adjusted to neutralize the effect of natural earth potential on the potential-responsive means in said circuit in accordance with the response of the other potential-responsive means.

This adjustment may be obtained in numerous manners, for example, an operator may manually adjust the opposing voltage in accordance with the indications of the other potential-responsive means, or the other potential-responsive means may include manual adjusting means mechanically associated with said circuit for adjusting said opposing voltage, or fully automatic means may be provided for continuously adjusting said opposing voltage to neutralization.

Each of the potential-responsive means may comprise a device for measuring, indicating, or continuously recording potential. The potential-responsive means included in said electric circuit may also comprise a part of an apparatus such as hereinafter described for measuring or recording the relation between the potential and the energizing current, and the other potential-responsive means may form part of an apparatus hereinafter described for automatically and at all times adjusting said opposing voltage to neutralization.

My invention will be better understood with reference to the accompanying drawings which illustrate schematically typical methods of practicing the present invention, and certain apparatus arrangements according to my invention, and referring thereto:

Figure 1:
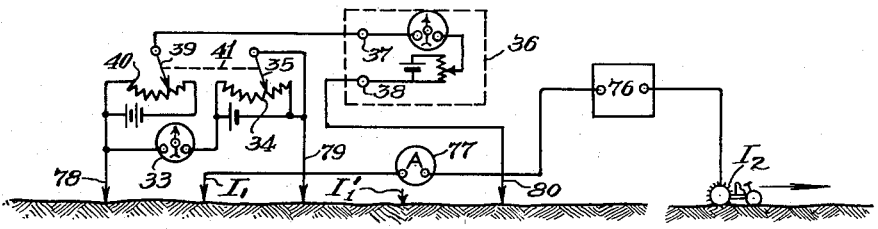
Fig. 1 is a diagrammatic vertical section illustrating an apparatus arrangement according to my invention.

Referring to Fig. 1, I have shown an apparatus arrangement which is particularly applicable to the minimization or substantial elimination of measurement errors resulting from natural earth currents. With this arrangement, energizing electrodes are shown at $I_1$ and $I_2$ and are spaced from one another along the earth's surface by a known distance and are connected through suitable conductors to a controllable current source 76 such as a continuous current generator. An ammeter 77 may be connected in the energizing circuit to measure the energizing current. The electrode $I_1$ is shown as a fixed electrode while the electrode $I_2$ is shown as a mobile electrode device such as shown in my United States Patent No. 2,105,247 and may be assumed to be moving or as capable of being moved while maintaining continuous electrical contact with the earth's surface, in the direction of the arrow. Usually, measurements are made "going-out" on one line, and "coming-in" on the next line, which results in a considerable saving in field operating time. Potential electrodes are shown connected to the earth on opposite sides of the electrode $I_1$ at 78 and 79 and may be located substantially on a line passing through the energizing electrodes. A third potential electrode is shown at 80, and may be located on the above-mentioned line and on the side of the electrode 79 toward $I_2$.

Potential-responsive means such as a galvanometer 33 is shown connected in an electric circuit which includes a potential divider 34 provided with a movable arm 35, which electric circuit is connected to the spaced points represented by the electrodes 78 and 79. It is apparent that the galvanometer 33, the potential divider 34, and the movable arm 35 comprise the elements of a potentiometer such as is well known to the art, and that more or less voltage may be impressed between electrodes 78 and 79 according to the position of the arm 35 with respect to the ends of the divider 34, the position of the arm 35 when a null reading is obtained on the galvanometer 33 being indicative of the potential existing between the electrodes 78 and 79. An electric circuit is shown connected to the electrodes 78 and 80 and including a potential-responsive device such as a potentiometer 36 connected into said circuit through its terminals 37 and 38. This last-mentioned electric circuit also includes a source of opposing potential comprising a movable arm 39 connected to a potential divider 40.

Passage of an electric current through the earth between the electrodes $I_1$ and $I_2$ will create a potential difference at positions on the earth's surface, for example, at the positions defined by the electrodes 78 and 80, which are shown as located on opposite sides of the energizing electrode $I_1$. By correctly positioning the electrodes 78 and 79, the potential difference created therebetween by the energizing current may be substantially minimized or eliminated, or, stated in different terms, the electrodes 78 and 79 will be equally affected by the energizing current. For practical purposes this may be accomplished by spacing the electrodes 78 and 79 at two points on the created equipotential circle surrounding the electrode $I_1$, and in opposite directions from the electrode $I_1$, along the line passing through the energizing electrodes or along a line parallel thereto.

In order to simplify the consideration of the factors involved, let us assume that there are no ground currents flowing in the region containing the electrodes $I_1$ and $I_2$, in which event all points in the region will normally be at the same potential. Upon passing an electric current through the earth between the electrodes $I_1$ and $I_2$ an electric or potential field will be created and there will be lines of equal potential which may be drawn along the earth's surface. On opposite sides of one of the electrodes, I₁ for example, and substantially on the line passing through the electrodes there will be two points such as 78 and 79 which lie on the same equipotential line, so that when a measuring instrument is connected to these points no potential will be indicated. If now an earth current is flowing in the region under consideration there will be a second potential field superposed upon the created potential field so that there may be a difference in potential between the pair of points such as 78 and 79 above referred to. Other points such as the points 78 and 80, in the potential field, will also have an extra potential difference due to the natural earth current and the relative effect at the two positions will be in accordance with known considerations, for example, in accordance with the distances between the electrodes 78 and 79, and 78 and 80 with the arrangement shown.

As an example of the manner of locating a pair of points, such as the points 78 and 79, whose potential difference is substantially unaffected by the energizing current and whose potential difference is due substantially wholly to natural earth potentials, I may proceed as follows:

The point 78 may be arbitrarily located at a convenient distance from the electrode I₁ and the point 79 may be temporarily located at an equal distance therefrom on the opposite side thereof. The earth is then intermittently energized by intermittently applying current between the electrodes I₁ and I₂ and the galvanometer 33 is observed to see if the energizing current produces an effect thereon. If such is the case, the point 79 is shifted to new positions along the line passing through the energizing electrodes until a position is found where the energizing current has no appreciable effect on the indications of the instrument 74. It may be necessary, if the electrode I₂ is moved for a considerable distance, to relocate the point 78 or 79, since the created potential field will shift slightly and the energizing current will produce a measurable potential difference between the points 78 and 79. This relocating may be done in the manner above described and will usually require changing the location of one of the points a few feet.

Natural earth currents usually are regional in character and may be considered as flowing in substantially straight lines over rather large areas, so that if the distance between the electrodes 78 and 80 is equal to twice the distance between the electrodes 78 and 79, the potential differences or variations produced therebetween by the natural earth currents will be substantially twice as great.

It is now apparent that the natural earth potentials existing between the electrodes 78 and 79 may be measured continuously while the energizing current is flowing between the electrodes I₁ and I₂, and that the position of the movable arm 35 on the potential divider 34 required to maintain the galvanometer 33 at zero, is a measure of such potential. Knowing the calibration of the potential divider 40 and the spacial relationship of the electrodes 78, 79, and 80, the movable arm 39 may be set in accordance with the position of the movable arm 35 to introduce an opposing voltage in the electric circuit connected between the electrodes 78 and 80, which adjustment neutralizes the natural earth potentials existing therebetween so that the potential indicated by the potentiometer 36 is substantially free from errors due to natural earth potentials.

In order to expedite operation I prefer to place the arms 35 and 39 upon a common insulated shaft, provide the potential drop 34 and 40 with the same characteristics and adjust the total potential drop across each one so that the movement of the arm 35 required to neutralize the earth potential existing between the electrodes 78 and 79 will introduce the proper potential in the circuit connecting the electrodes 78 and 80, which will neutralize the natural earth potentials existing therebetween. The means for obtaining the correspondence of motion of the arms 35 and 39 is indicated diagrammatically by the dotted line 41. Such means may comprise part of an automatic potentiometer as is well known to the art.

It will be understood that I may provide well known means for adjusting the total voltage drop across each of the potential drops 34 and 40 in order to provide sufficient voltage in the respective circuits connected thereto for opposing the ground potential.

Although I may utilize the construction shown and a mechanical linkage between the arms 35 and 39 and use a potentiometer connected between the electrodes 78 and 79, it will be appreciated that an indicating instrument may be connected between the electrodes 78 and 79 and that the earth neutralizing potential in the circuit connected between the electrodes 78 and 80 may be manually adjusted in accordance with the indications of the indicating instrument. Also, potential between 78 and 79 may be continuously recorded and subtracted from the potential recorded between 78 and 80, while simultaneously recording the current flowing between I₁ and I₂.

It will also be appreciated that the elements 33, 34, and 35 may be incorporated in an automatically adjusting potentiometer as is well known to the art, in which case the operating link 41 may be operable to automatically and continuously adjust the arm 39 and continuously neutralize the effect of natural earth potential on the measured potential.

Measurements involving the created difference in potential at the poistion of measurement defined by the electrodes 78 and 80 as corrected in accordance with the natural earth potential existing between the electrodes 78 and 79, may be continued as the electrode I₂ moves outwardly, for example along the line passing through the energizing electrodes, from some initial to some final value of separation. If desired, additional measurements may be taken while the electrode I₂ is moving along such a line in the opposite direction and on the opposite side of the electrode I₁. In such a case it is preferable to shift the position of the electrode I₁ to the position indicated at I′₁ which lies on the above-mentioned line substantially midway between the electrodes 79 and 80. This arrangement would then correspond to the arrangement shown with the electrode I₂ moving to the right of the electrode I₁, the electrodes on the opposite sides of the stationary energizing electrode being affected primarily by natural earth potentials, and the electrodes between the energizing electrodes being affected by both the earth potentials and the created potential. The purpose of shifting the electrode I₁ to the position indicated at I′₁ is to obtain an overlapping in the area through which current flows, thereby obtaining information regarding electrical properties of the strata with current flowing first in one direction and then in the other.

Figure 2:
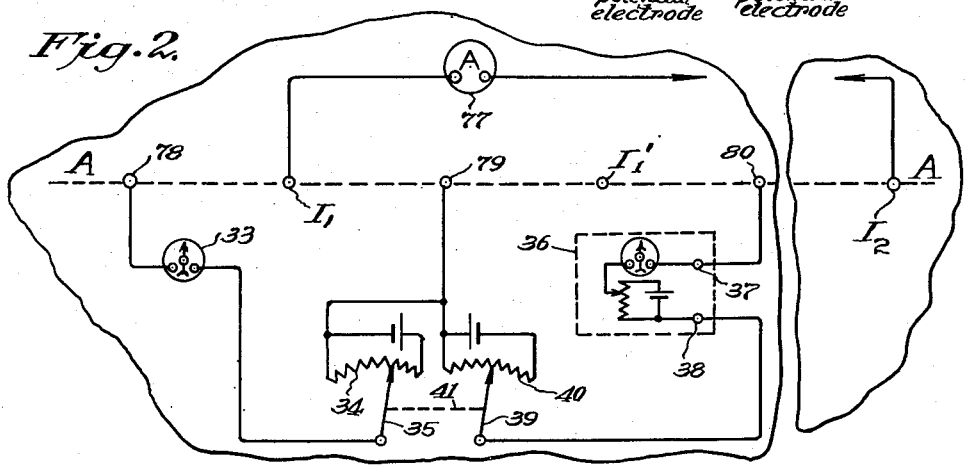
Fig. 2 is a diagrammatic plan view of a variational form of apparatus according to my invention.

Referring to Fig. 2, a modified apparatus arrangement is shown. In this figure the line passing through the energizing electrodes is designated A—A. With this arrangement, as with the arrangement shown in Fig. 1, the potential existing between the electrodes 78 and 79 is due primarily to natural earth potentials, and the electric circuit connected between the electrodes 78 and 79 includes the potential-responsive means 33, the potential divider 34 and the variable contact arm 35. The source of energizing current for passing an electric current through the earth between the electrodes I₁ and I₂ has been omitted in this figure and it may be assumed that said electrodes are suitably connected to a direct current generator, a battery, a source of direct current pulses, commutated direct current, or of alternating current. Instead of measuring the corrected created potentials existing between the electrodes 78 and 80 as in Fig. 1, these potentials are measured between the electrodes 79 and 80, the neutralizing voltage being varied in accordance with the response of the potential-responsive means connected in the circuit between the electrodes 78 and 79 by changing the position of the arm 39 on the voltage divider 40, so that the readings supplied by the potentiometer 36 will be free from errors due to natural earth potentials.

It should be noted that electrodes 78 and 79 are on an equipotential circle and that as far as the potential difference due to the electric field is concerned, the difference in potential between the electrodes 79 and 80 is substantially the same as the difference in potential between the electrodes 78 and 80. However, the potential difference due to natural earth potentials between the electrodes 78 and 79 will be substantially the same as between the electrodes 79 and 80, so that the correction applied by the portion of the voltage divider 40 which is in the circuit between the electrodes 79 and 80 will be the same as the voltage required in the circuit between the electrodes 78 and 79 to produce a null reading of the galvanometer 33. In other words, the voltage between each pair of electrodes is in the same ratio as the distance therebetween.

Figure 3:
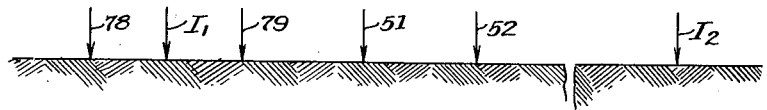
Fig. 3 is a modified electrode arrangement according to my invention.

Referring to Fig. 3, I have shown an electrode arrangement in which the measurement involving the created potential as corrected for natural earth potentials is made between one pair of electrodes designated as 51 and 52 which are located between the energizing electrodes I₁ and I₂, while the potential-responsive means which is used to provide the corrective value of the natural earth potential is connected as before between a pair of electrodes 78 and 79 which are located at substantially equal distances on opposite sides of the energizing electrode I₁. The electric circuit which includes the potential-responsive device 33 may be connected, as before, between the electrodes 78 and 79, while the electric circuit which includes the potential-responsive device 36 may be connected between the electrodes 51 and 52. It is generally preferable to use two separate sets of electrodes as shown in Fig. 3, rather than to use a common electrode as shown in Figs. 1 and 2, since a flow of current occurring in either one of the circuits connected between either pair of the separate pairs of electrodes will have no appreciable effect on the circuit connected between the other pair of electrodes. When using the arrangement shown in Fig. 1, for example, a flow of current through the electrode 79 occasioned by an unbalance of either circuit connected thereto will tend to make balancing of the other circuit connected thereto difficult due to the potential drop produced in the region adjacent the electrode 79 by the flow of current. It is to be noted that it is also within the contemplation of this invention to take measurements involving the created potential as corrected for errors due to natural earth potentials, between points which are located between the energizing electrodes, located outside the energizing electrodes, or between points located on opposite sides of an energizing electrode, as well as between points laterally removed from the line passing through the energizing electrodes.

Although I prefer to use continuous unidirectional current for energizing the earth, it will be appreciated that I may use direct current pulses, alternating current pulses, commutated direct current, or low frequency alternating current, and that proper changes in the measuring circuits and instruments may be made when required, as will be apparent to those skilled in the art, without departing from the broad contemplation of this invention.

Numerous procedures may be followed with the apparatus shown in Figs. 1 to 3. For example, the current passed through the earth between the electrodes I₁ and I₂ may be maintained constant, or the value thereof may be measured at each of the positions of the electrodes I₁ and I₂, or the current may be varied in a predetermined manner in accordance with separation between the electrodes I₁ and I₂, or the current may be varied or kept constant over extended periods of time while maintaining the energizing electrodes in a fixed position so as to take a series of measurements of created potentials to determine variations in the created potential resulting from the time and magnitude of current flow, in which each of the measurements is corrected for errors resulting from natural earth potentials in accordance with the response of a potential-responsive means connected to a pair of spaced points whose potential difference is substantially unaffected by the flow of energizing current.

The method of this invention is admirably adapted to the procedure of maintaining a predetermined value of potential difference between the electrodes whose potential difference is influenced by the created potential, for example between the electrodes 79 and 80, and measuring the current required to give this predetermined value of potential for each of the positions of the energizing electrodes I₁ or I₂. The influence of the natural earth potential on the measured current may be eliminated by introducing a potential in opposition to the natural earth potential existing between the electrodes 79 and 80 and adjusting this potential to neutralization in accordance with the potential difference existing between a pair of electrodes which are influenced substantially only by natural earth potentials.

According to a preferred procedure, I provide means for directly measuring the relation between the current in the energizing circuit and the potential between a pair of potential electrodes, while the current is maintained approximately constant or is varied in any manner. Such measurements may be obtained with an apparatus in which the potential and energizing circuits are electrically and electrostatically isolated from one another.

Figure 4:
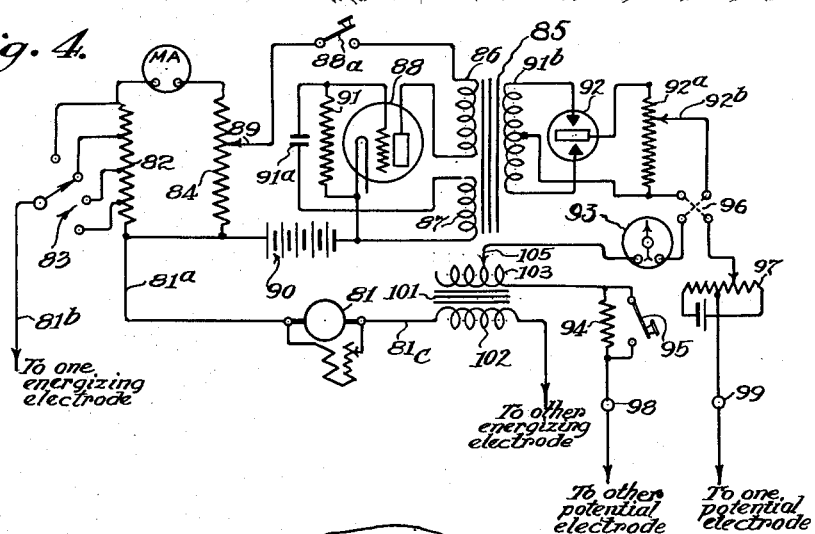
Fig. 4 is a wiring diagram of a form of apparatus according to my invention, for taking ratio measurements.

An apparatus of the type above described is illustrated in Fig. 4. The energizing current from a source of current 81 passes through a conductor 81a and through a resistor 82 having a variable tap switch 83 for various ranges of current value and then to one energizing electrode through a conductor 81b. A conductor 81c connects the other side of the source of current 81 to the other energizing electrode. The oscillatory circuit comprises a transformer 85 provided with plate and grid windings 86 and 87 disposed in inductive relation to one another, and an electron discharge device 88 such as a vacuum triode. The plate cathode circuit of the discharge device 88 comprises the plate winding 86, the movable arm 89 of a potentiometer 84, and a source of plate potential 90. The grid circuit comprises the grid winding 87 and a grid-leak and condenser indicated at 91 and 91a. Oscillations may be initiated by closing the switch 88a in the plate cathode circuit. It may be seen that the potentiometer 84 is included in the plate cathode circuit of the discharge device so that the amplitude of oscillation of the oscillatory circuit will be either increased or decreased with increasing or decreasing voltages across the potentiometer 84. The transformer 85 is provided with a third or output winding 91b, which is connected to a rectifier 92, and a potentiometer 92a is connected across the output of the rectifier 92. A reversing potentiometer 97 is connected between a variable tap 92b on the potentiometer 92a and a terminal 99 which may be connected to one potential electrode. Another terminal 98, which may be connected to the other potential electrode, is connected to the other side of the potentiometer 92a through a series circuit including a null point galvanometer 93 and a circuit protecting resistor 94 provided with a shunt key 95. A reversing switch is provided at 96 to reverse the polarity of the rectified output. The reversing potentiometer 97 serves to neutralize the rectified potential created across the resistor 92a by the oscillation of the discharge device at zero current flow in the energizing circuit, since it is not practical to have the tube circuit adjusted for zero amplitude at zero current flow. The circuit is therefore adjusted for low amplitude oscillations at zero energizing current flow, and the potential created by these low amplitude oscillations is neutralized by the potentiometer 97.

By use of proper circuit constants, well known to the art, a substantially linear relationship may be obtained between the additional potential applied to the plate of the discharge device by the voltage drop across the potentiometer 84, and the rectified potential created across the terminals 98 and 99. With such linear relationship, the variations in current in the energizing circuit will introduce a compensating variation in the rectified potential impressed across the terminals 98 and 99. The apparatus may then be used for measuring the relation of the potential difference existing between a pair of potential electrodes to the value of the energizing current, by noting the position of the movable arm 89 of the potentiometer 84 required to give a null reading of the galvanometer 93. The apparatus above described is disclosed and claimed in my copending application Serial No. 172,009, filed October 30, 1937.

A particular advantage of the apparatus above described is that it removes the necessity of accurately measuring the current or of maintaining the current at a fixed and known value. However, this advantage introduces difficulties when the potential and energizing leads extend over great distances and in close proximity to one another. Under such conditions the mutual inductance between the potential and energizing leads is sufficiently great so that voltages of sufficient magnitude are introduced into the potential circuit as to cause an erratic operation of the potential-responsive device such as the galvanometer 93. These voltage variations are produced by small variations in current in the energizing circuit and may be sufficiently slow as to cause the galvanometer needle to follow them.

The effects of the mutual inductance between the potential and energizing leads may be substantially eliminated by providing a lumped mutual inductance such as a transformer 101 provided with a primary 102 in series with the energizing lead 81c and a secondary winding 103. The voltage derived from the secondary 103 of the transformer will vary at the same rate as the stray mutual inductance voltages introduced in the potential circuit by the stray mutual inductance between the energizing and potential leads. Thus, by introducing a desired voltage, as for example, a portion of the voltage induced in the secondary 103 in the correct direction in the potential circuit, the stray mutual inductance effects may be eliminated. The winding 103 may preferably be a single layer, with a sliding contact arm 105 which is connected to the galvanometer 93 so that a correct proportion of the potential induced in the transformer 101 may be introduced in the circuit between the terminals 98 and 99 to nullify the effects of stray mutual inductance. In operation, the position of the slider 105 is varied until a position is found in which variations of current produce no appreciable variation of the galvanometer 93.

The method of obtaining measurements which are substantially free from errors due to natural earth currents is not necessarily limited to the direct measurement of potential as given by the potentiometer 36 for example, but may be employed in conjunction with the apparatus shown in Fig. 4 to obtain a direct measurement of the relation of the energizing current to the potential created thereby between a pair of spaced points on the earth's surface while maintaining such measurements substantially free from errors resulting from natural earth potentials. Thus I may connect the terminals 98 and 99 of the ratio measuring device in the place of the terminals 37 and 38 of the potentiometer 36 shown in Figs. 1 and 2 and place the resistor 82 in series with the energizing circuit for the electrodes $I_1$ and $I_2$. With the arrangement shown in Fig. 3, the terminals of the ratio measuring device would be placed in the circuit connected between the electrodes 51 and 52. In each case a neutralizing potential is placed in opposition to the natural earth potential existing in the circuit connected to the terminals 98 and 99 which potential may be adjusted to neutralize earth potentials in accordance with the potential resulting substantially wholly from natural earth potentials between a pair of spaced points on the earth's surface.

Figure 5:
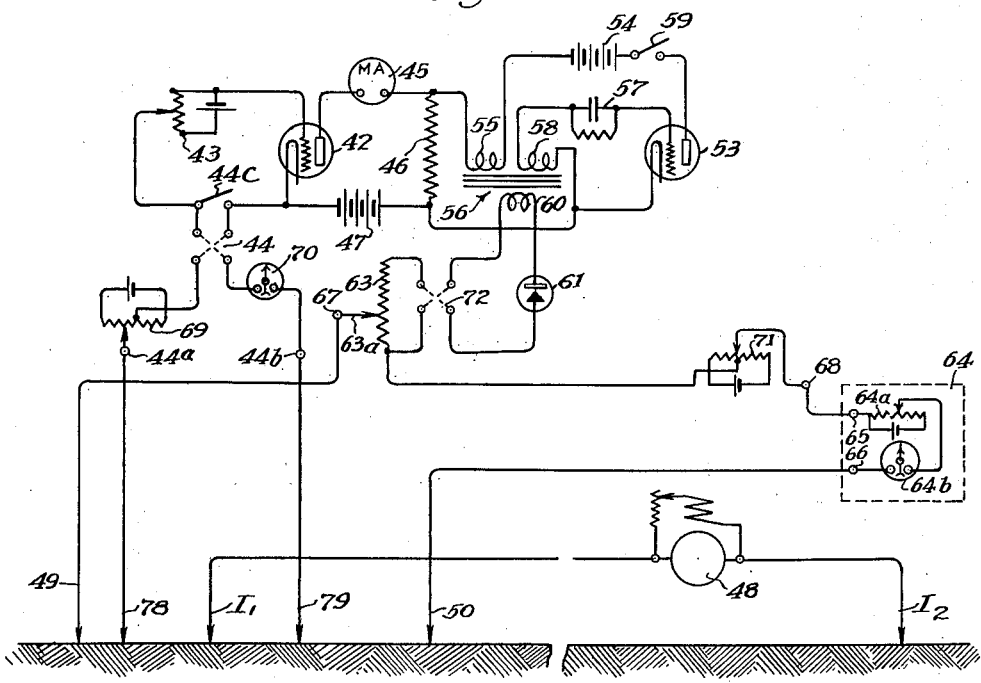
Fig. 5 is a wiring diagram of another form of apparatus according to my invention.

Referring to Fig. 5, an apparatus is shown for automatically introducing a potential in the potential measuring circuit to nullify the effects of natural earth potentials. An electron discharge device is shown at 42 with its input or grid-cathode circuit comprising an adjustable potentiometer 43 and a reversing switch 44 reversibly connecting terminals 44a and 44b, connected to potential electrodes 78 and 79, in series in said circuit. The output or plate-cathode circuit of the discharge device 42 is shown as comprising a milliammeter 45, a potential drop resistor 46, and a source of plate potential 47, connected in series. As above described in relation to Figs. 1-3, the electrodes 78 and 79 are so positioned as to be responsive substantially wholly to natural earth potentials.

The electrodes 78 and 79 are shown connected to the earth on opposite sides of energizing electrode $I_1$, which is connected through suitable conductors to a source of energizing current 48 and to another energizing electrode $I_2$. The potential drop across the resistor 46 may be made to vary in accordance with the potential existing between the electrodes 78 and 79 by properly adjusting the constants of the circuits associated with the electron device 42, as is well known to the art.

Potential electrodes are shown at 49 and 50, the electrode 49 being located on the side of the electrode 78 away from the electrode $I_1$ and the electrode 50 being located between the electrodes $I_1$ and $I_2$ on the side of the electrode 79 away from the electrode $I_1$, electrode 50 being further removed from electrode $I_1$ than electrode 49. The electrodes 49 and 50 are so positioned as to be influenced by both the potential created by the flow of energizing current between the electrodes $I_1$ and $I_2$ and the natural earth potential existing therebetween.

A second electron discharge device is shown at 53 and has a plate-cathode circuit including a source of plate potential 54, a winding 55 of a transformer 56 and said resistor 46. The grid-cathode circuit of the discharge device 53 is shown as comprising a grid-leak and condenser 57 and a second winding 58 of the transformer 56.

A switch 59 is shown in the last-mentioned plate-cathode circuit and it is apparent that upon closing switch 59 oscillations will be generated by the discharge device 53 and the amplitude of such oscillations will be a function of the plate cathode voltage. This voltage results from the source of plate potential 54 and from the voltage drop across the resistor 46, which voltage drop varies with the potential existing between the electrodes 78 and 79. By providing a third winding 60 on the transformer 56 having its terminals connected through a rectifier 61 across a potential drop or resistor 63, the voltage variations produced across this potential drop may be made to vary in accordance with the potential variations existing between the electrodes 78 and 79.

The voltage drop 63 is shown as provided with an adjustable arm 63a which is connected to a terminal 67, to which is connected the electrode 49. Another terminal is shown at 68 and is also connected into the rectifier circuit. Thus the voltage between the terminals 67 and 68 may be made to vary in accordance with the natural earth potentials existing between the electrodes 78 and 79. A potential-responsive device, such as a potentiometer 64, is shown with its terminal 65 connected to the terminal 68 and its other terminal 66 connected to the electrode 50. By proper adjustment of the electron discharge circuits above described, the indications of the potential-responsive device 64 may be made free from errors due to natural earth potentials and will result substantially wholly from the potential created by the energizing current between the electrodes 49 and 50.

Numerous procedures may be employed for effecting a balance in the circuits of the above-described apparatus so that the potential variations between the terminals 67 and 68 will be in accordance with the variations in natural earth potential between the terminals 44a and 44b. In general, this will require the adjustment of the input circuit of electron discharge device 42 so that the plate output thereof as indicated by the milliammeter 45 is in the desired portion of the characteristic curve of this discharge device. Also, it will require the balancing, at a given instant, of all of the undesired voltages, both constant and variable, in circuit between electrodes 49 and 50 and between 78 and 79.

I have provided a switch 44c in the grid-cathode circuit of the discharge device 42 so that upon closing the switch 44c, preferably with the switch 44 in a neutral position, the only voltage present in the grid-cathode circuit of the device 42 is due to the potentiometer 43 which may be adjusted to give the desired value of plate current as read by the milliammeter 45. At the same time this causes a known potential to be impressed across the resistor 63. The apparatus may be calibrated so that a given voltage change in the grid circuit of discharge device 42 produces a proportionate given change in voltage across the resistor 63. As before stated, the values of the natural earth potentials in circuit between electrodes 49 and 50 and between 78 and 79 is proportional to the spacing between the respective electrodes of the pairs. By previous calibration the slider 63a may be set to a proper position, determined from the ratio of the spacing between the electrodes of the two pairs, where changes in natural earth potential in circuit between electrodes 78 and 79 cause the automatic introduction in the measuring circuit of a potential opposing, and substantially equal to, the change in natural earth potential between the electrodes 49 and 50.

With the switch 44c still closed, the reversing switch 44 may be closed, and a reversing potentiometer 69, provided in this circuit, may be adjusted to oppose the potential existing between the electrodes 78 and 79, which adjustment is indicated by a null reading on a galvanometer 70 provided in the same circuit. Simultaneously with this adjustment and with switch 59 closed so that discharge device 53 is in oscillation, the circuit including the electrodes 49 and 50 is also adjusted to nullify the total potential existing between these electrodes. This may be accomplished by adjusting a potentiometer 71 provided in this circuit until a null reading is obtained on galvanometer 64b, while the potentiometer 64a of the potential-responsive device 64 is set at zero. When the potentiometers 69 and 71 are adjusted to bring the galvanometers 70 and 64b to zero at a given instant, the voltages resulting from polarization potential and from natural earth potential at a given instant are completely eliminated from the subsequent readings. When employing non-polarizing electrodes, it has been found that the polarization potentials resulting from the contact of the electrodes with the different types of soil, will remain substantially constant throughout a series of measurements. The natural earth potentials will vary, however, and it is the purpose of this apparatus to produce a potential in the potential circuit connected to the electrodes 49 and 50 which varies in opposition to these natural earth potentials and automatically neutralizes the effect thereof in this circuit and as a consequence on the resulting measurement.

The apparatus may now be set in operation by opening switch 44c, assuming, of course, that switch 59 is closed. Proper polarity or phasing of the two circuits is obtained by manipulating reversing switch 44 in circuit with electrodes 78 and 79 which are connected to the earth at two spaced points so positioned that the potential difference therebetween is substantially unaffected by the flow of energizing current, and reversing switch 72 in the measuring circuit, which circuit is connected to the earth at points between which a potential difference is created by the flow of energizing current and between which points the natural earth potential bears a known relation to the natural earth potential between points at wihch electrodes 78 and 79 are located.

It should be appreciated that numerous procedures may be employed for obtaining the balance of the various circuits and that various refinements may be incorporated in the circuits above described. Hence, I do not choose to be limited to the above modification, but rather to the scope of the appended claims.

It will be appreciated that when the apparatus shown in Fig. 5 may be used in conjunction with the apparatus shown in Fig. 4, in which case the potential which varies in accordance with the natural earth potentials, i. e., the potential existing across the terminals 67 and 68 may be placed in series in the electric circuit connected to the terminals 98 and 99 after the manner of the potential drop 40 of Fig. 1 when the apparatus of Fig. 4 is substituted for the potentiometer 36, as will be apparent to one skilled in the art.

The arrangement shown in Figs. 1 to 3 and 5 are not necessarily limited to the employment of a mobile electrode device, and substantial advantages may be obtained with the arrangements shown while using a common stake electrode as the electrode I₂. It is also to be noted that advantages other than the minimization or elimination of earth potentials are realized from the arrangements shown. For example, the use of fixed potential electrodes will, in general, minimize and substantially eliminate the errors due to near-surface effects, since all measurements obtained will be affected substantially equally by the near-surface in the neighborhood of the fixed potential electrodes, and variations in the plotted data will result primarily from the effects of the deeper lying structure of economic importance. The advantages of a fixed energizing electrode and of fixed potential electrodes are fully brought out in my copending application Serial No. 172,009, filed October 30, 1937.

Figure 6:
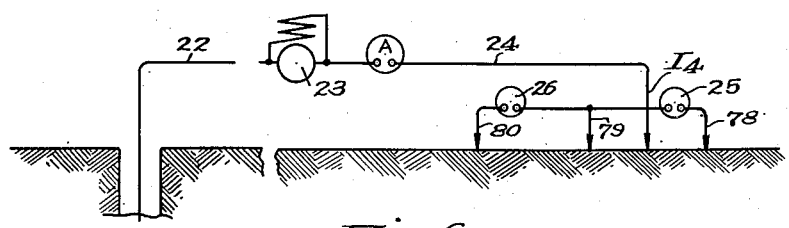
Fig. 6 is a diagrammatic vertical section showing my apparatus as used in bore-hole surveying.

The method of this invention is not limited to surveys employing an energizing electrode which is moved along the surface of the earth, but may be employed with bore-hole surveying. Referring to Fig. 6, a movable electrode I₃ is shown located in a bore-hole 21 and connected through insulated conductor 22 to a source of current 23 which is connected through insulated conductor 24 to an electrode I₄ in contact with the earth at a position laterally spaced from the bore-hole. Potential electrodes 78 and 79 are shown positioned on opposite sides of electrode I₄ in such manner that the potential difference therebetween results substantially wholly from natural earth potential and that the potential difference is substantially unaffected by the flow of current between I₃ and I₄. A third potential electrode 80 is shown positioned so that the potential difference between said electrode and electrode 79 results from the combined effect of natural earth potential and potential created by the energizing current and so that the natural earth potential between electrodes 79 and 80 bears a fixed relation to the natural earth potential between electrodes 78 and 79. Potential-responsive measuring means 25 and 26 are connected between electrodes 78 and 79 and 79 and 80 respectively. Measurements may be taken with the electrode I₃ located at different depths in the bore-hole. Separate pairs of potential electrodes as shown in Fig. 3 may be employed in place of the three potential electrodes shown in Fig. 6. The moving bore-hole electrode I₃ may be of any type, for example, it may comprise a drilling apparatus as described in my copending applications Serial Nos. 112,207 and 129,839, filed November 23, 1936, and March 9, 1937, respectively.

It will also be appreciated that my invention is not limited to the employment of a fixed energizing electrode, or to two fixed energizing electrodes, or to the employment of fixed potential electrodes and that both the potential electrodes and the energizing electrodes may be moved successively to different positions on the earth's surface to obtain successive measurements, while maintaining the same or different spacings between energizing electrodes and between the respective potential electrodes of each pair. The only limitation is that the potential difference between a pair of potential electrodes which are so located that the potential difference therebetween is substantially unaffected by the energizing current and is due substantially to the natural earth currents in the region, is used as a basis for electrically eliminating the effects of natural earth potentials from measurements taken involving the potential difference between a pair of potential electrodes whose potential difference is due both to the energizing current and to the natural earth currents in the same region.

It is to be understood that this invention is not limited to the specific electrode and apparatus arrangements herein shown and described, nor to the examples of procedures delineated, but rather to the scope of the appended claims.

I claim:

1. In a system of electrical exploration of the subsurface in which a measurement is taken involving the potential difference created between two spaced points by the flow of an energizing current through the earth, the method of eliminating the effect of natural earth potential on such measurement which comprises introducing a potential in opposition to the natural earth potential between said two spaced points and controlling said introduced potential in accordance with the natural earth potential between two spaced points which are so positioned with respect to the path of said current that the potential difference therebetween is substantially unaffected by said current.

2. In a system of electrical exploration of the subsurface in which a series of measurements are taken involving the potential difference created between spaced points on the earth's surface by the flow of an energizing current through the earth and in which successive measurements are influenced by inhomogeneities in the subsurface, the method of eliminating the effects of natural earth potential on each of said measurements which comprises introducing a potential in opposition to the natural earth potential between said spaced points and controlling said introduced potential in accordance with the natural earth potential between two spaced points which are so positioned with respect to the path of said current that the potential difference therebetween is substantially unaffected by said current.

3. A method as set forth in claim 2, in which said introduced potential is continuously controlled.

4. A method as set forth in claim 2, in which said introduced potential is automatically controlled.

5. A method of electrical exploration of the sub-surface which comprises: passing an electric current through the earth to create a potential difference between two spaced points; introducing a potential in opposition to the natural earth potential between said two points; controlling said introduced potential in accordance with the natural earth potential between two spaced points which are so positioned with respect to the path of said current that the potential difference therebetween is substantially unaffected by said current; and taking a measurement involving the potential difference created between said first-named two spaced points.

6. A method of electrical exploration of the sub-surface which comprises: passing an electric current through the earth to create a potential difference between two spaced points; introducing a potential in opposition to the natural earth potential between said two points; controlling said introduced potential in accordance with the natural earth potential between two spaced points which are so positioned with respect to the path of said current that the potential difference therebetween is substantially unaffected by said current; and taking a series of measurements involving the potential difference created between said first-named two spaced points.

7. A method of electrical exploration of the sub-surface which comprises: passing an electric current through the earth between a pair of spaced energizing electrodes to create a potential difference between a pair of spaced points on the earth's surface located substantially on a single straight line passing through said energizing electrodes; introducing a potential in opposition to the natural earth potential between said pair of spaced points; controlling said introduced potential in accordance with the natural earth potential between a pair of spaced points located substantially on a straight line and on opposite sides of one of said energizing electrodes in such positions that the potential difference therebetween is substantially unaffected by said current and that the natural earth potential therebetween has a known relation to the natural earth potential between the first-mentioned pair of points; and taking a measurement involving the potential difference created between said first-mentioned pair of points.

8. The method set forth in claim 7, in which said first-mentioned points are located between said energizing electrodes and the points of one pair are space-separated from the points of the other pair.

9. The method set forth in claim 7, in which said first-mentioned points are located between said energizing electrodes and each pair of points has one point in common with the other pair.

10. An apparatus for use in the electrical exploration of the subsurface which comprises: an energizing circuit for creating a potential difference between a pair of spaced points on the earth's surface, including a pair of spaced-apart energizing electrodes and means for passing an electric current through the earth therebetween; means responsive to the natural earth potential between a pair of spaced points which are so positioned that the potential difference therebetween is substantially unaffected by said current and that the natural earth potential therebetween has a known relation to the natural earth potential between the first-mentioned pair of points; means for introducing a potential difference in opposition to the natural earth potential between the first-mentioned pair of points; means for adjusting said introduced potential in accordance with the response of said means responsive to natural earth potential; and measuring means responsive to the created potential difference between said first-mentioned pair of points.

11. An apparatus as set forth in claim 10, in which the straight line between the two points of one pair extends in substantially the same direction as the straight line between the two points of the other pair.

12. An apparatus as set forth in claim 10, in which all of said points are located substantially on a single straight line passing through said energizing electrodes and said last-mentioned pair of points are located at opposite sides of one of said energizing electrodes.

13. An apparatus as set forth in claim 10, and further comprising a lumped mutual inductance coupling said energizing circuit and said measuring means for reducing the inductive effects on measurements obtained thereon produced by changes in energizing current.

14. An apparatus for use in the electrical exploration of the subsurface which comprises: an energizing circuit for creating a potential difference between a pair of spaced points on the earth's surface, including a pair of spaced energizing electrodes and means for passing an electric current through the earth therebetween; means responsive to the natural earth potential between a pair of spaced points which are so positioned that the potential difference therebetween is substantially unaffected by said current and that the natural earth potential therebetween has a known relation to the natural earth potential between the first-mentioned pair of points; means for introducing a potential difference in opposition to the natural earth potential between the first-mentioned pair of points; means for adjusting said introduced potential in accordance with the response of said means responsive to natural earth potential; and means for measuring the relation between said potential difference created between said first-mentioned points and said energizing current.

15. An apparatus as set forth in claim 14, and further comprising a lumped mutual inductance coupling said energizing circuit and said last-named means for reducing the inductive effects on measurements obtained thereon produced by changes in energizing current.

16. An apparatus for use in the electrical exploration of the subsurface, which comprises: an electric circuit including an electron discharge device and a resistor, said circuit being connected to a pair of spaced points on the earth's surface and operable to produce a voltage across said resistor which varies in accordance with the natural earth potential between said points; another electric circuit including an electron discharge device and said resistor, said electron discharge device being capable of producing oscillations and the amplitude of said oscillations being controlled by variations in voltage across said resistor produced by said first-named discharge device; and a rectifier circuit coupled to said last-named circuit whereby a unidirectional potential is produced which varies in accordance with the natural earth potential between said points and is electrically isolated therefrom.

17. An apparatus for use in the electrical exploration of the subsurface, which comprises: an energizing circuit, including a pair of spaced energizing electrodes and means for passing an electric current through the earth therebetween to create a potential difference between a pair of spaced points on the earth's surface; a measuring circuit connected to the earth at said spaced points and including a potential-responsive measuring device; another circuit connected to the earth at two spaced points so positioned that the potential difference therebetween is substantially unaffected by said electric current and that the natural earth potential therebetween has a known relation to the natural earth potential between the first-named points; and means associated with said other circuit and with said measuring circuit and operable in response to variations in potential in said other circuit to automatically introduce in said measuring circuit a potential opposing and substantially equal to the natural earth potential between said first-mentioned pair of points.

JOHN JAY JAKOSKY.